United States Patent [19]

Scholz

[11] 3,827,442
[45] Aug. 6, 1974

[54] COMBINE CONTROL
[76] Inventor: Robert H. Scholz, Box 714, Thornton, Wash. 99176
[22] Filed: Mar. 21, 1973
[21] Appl. No.: 343,279

[52] U.S. Cl. .......... 130/24, 130/27 HF, 56/DIG. 15
[51] Int. Cl. .............................................. A01f 7/00
[58] Field of Search ................ 130/24, 27 R, 27 HF; 209/261; 56/DIG. 15

[56] References Cited
UNITED STATES PATENTS

| | | | |
|---|---|---|---|
| 1,855,169 | 4/1932 | Heier | 130/24 |
| 2,692,679 | 10/1954 | Lindberg et al. | 130/24 |
| 3,213,857 | 10/1965 | Ashton et al. | 130/27 HF |
| 3,495,598 | 2/1970 | Louks et al. | 56/DIG. 15 |

*Primary Examiner*—Antonio F. Guida
*Attorney, Agent, or Firm*—Wells, St. John & Roberts

[57] ABSTRACT

A fan speed control for hillside combines. The tendency of crop materials to move more quickly or more slowly along the cleaning shoes of a combine in response to uphill or downhill inclination of the combine is compensated by speed variation in the fan or blower that moves the materials over the pans. Fan speed is controlled by a mechanical linkage connecting an upright pendulum and a variable speed drive to the fan. The pendulum and associated linkage are calibrated to increase fan speed during downhill travel and to decrease fan speed during uphill travel, thereby substantially normalizing the movement of the crop materials over the cleaning shoes or pans for all such attitudes of the combine.

6 Claims, 5 Drawing Figures

PATENTED AUG 6 1974　　3,827,442

COMBINE CONTROL

BACKGROUND OF THE INVENTION

This invention is concerned with a problem common to harvesting and threshing machines such as combines used in the harvesting of grain or other agricultural crops. When used for hillside harvesting, the cleaning shoes or pans that separate grain from chaff are normally inclined to the front or rear, due to their constant orientation relative to the frame of the combine. While hillside combines today are widely provided with side leveling controls, most do not provide for leveling in the fore and aft directions, due to the complexity and expense of four-way leveling control mechanisms.

The forward or rearward inclination of the grain cleaning shoes or pans in a combine that results from hillside orientation along the path of the combine normally disrupts the usual flow of materials along the length of the cleaning shoes or pans. If the fan speed and blast of air along the cleaning shoes remains constant, material collects at the front of the cleaning shoes during downhill combine movement and falls prematurely from the rear of the shoes during uphill combine movement. This results in inefficient separation and loss of valuable product.

Others have concerned themselves with this problem. U.S. Pat. No. 2,611,487 utilizes dampers of valves to vary the flow of air from the main blower fan and prevent accumulation of material on separating pans. The dampers or valves are operated from a pendulum on the apparatus.

U.S. Pat. No. 2,692,679 uses a pendulum to control an air valve, but is concerned with compensation for sidehill inclination. U.S. Pat. No. 2,950,720 utilizes a pendulum connected to an air deflector that causes a change in direction of air across a separator apparatus to compensate for uphill or downhill inclination.

The present assembly eliminates the need for variable dampers or valves, and provides direct control of crop movement by variation of fan speed in response to inclination of the apparatus. Control is provided by a direct mechanical assembly. The assembly also provides readily for mechanical overriding of the controls to permit the fan speed to be manually set at any desired constant value.

SUMMARY OF THE INVENTION

The described invention comprises a fan speed control for hillside combines to compensate for forward or rearward inclination of the cleaning shoes by varying the speed of the fan associated with the shoes. It includes a variable speed drive interposed in the drive train beyween the fan and a source of power. It further includes an upright pendulum pivotally mounted to the combine about a transverse axis so as to be responsive to forward or rearward inclination of the combine. Finally, it includes means operatively connected between the pendulum and the variable speed drive to vary the rotational speed of the fan in direct response to the angular location of the pendulum relative to the combine about the transverse pendulum axis.

It is a first object of this invention to provide a relatively simple mechanical speed control for the blower fan of a combine separator assembly.

Another object of this invention is to provide a direct mechanical control for fan speed, the control being automatically responsive to uphill or downhill inclination of the combine.

Another object of this invention is to provide an automatic fan speed control that can be readily adapted to all existing combine designs.

These and further objects will be evident from the following disclosure, which is concerned with a preferred embodiment of the invention and shown as it would be mounted externally on a typical combine. It is to be understood that the disclosed form of the invention is only exemplary, and that the scope of the invention itself is set out in the claims following this description.

DESCRIPTION OF THE PREFERRED EMBODIMENT

The drawings illustrate the external controls that constitute the invention. They schematically show the areas of the combine 8 on which the controls are utilized, but do not show the combine details. The details of such combines and their methods of operation are well known and described in detail in many prior patents, such as the prior U.S. Pat. 2,611,487, which disclosure is hereby incorporated by reference into this description.

Combined for harvesting materials such as grain, use moving cleaning shoes or pans 7 along which the separated chaff and grain move longitudinally. The grain is normally moved forwardly along these cleaning shoes while the chaff is blown rearwardly and finally exits at the back end of the combine.

The fan or blower 9 within the combine 8 produces a stream or blast of air along the transverse riddles in the cleaning shoes to gradually move the chaff rearwardly while allowing for separation of the threshed grain. However, with a constant stream of air, chaff will tend to collect forwardly along the cleaning shoes 7 when the machine is moving downhill and will tend to move rearwardly prematurely when the machine is traveling uphill. This invention is concerned with the normalizing of movement of the grain and chaff under such longitudinally inclined conditions.

Figure 1:
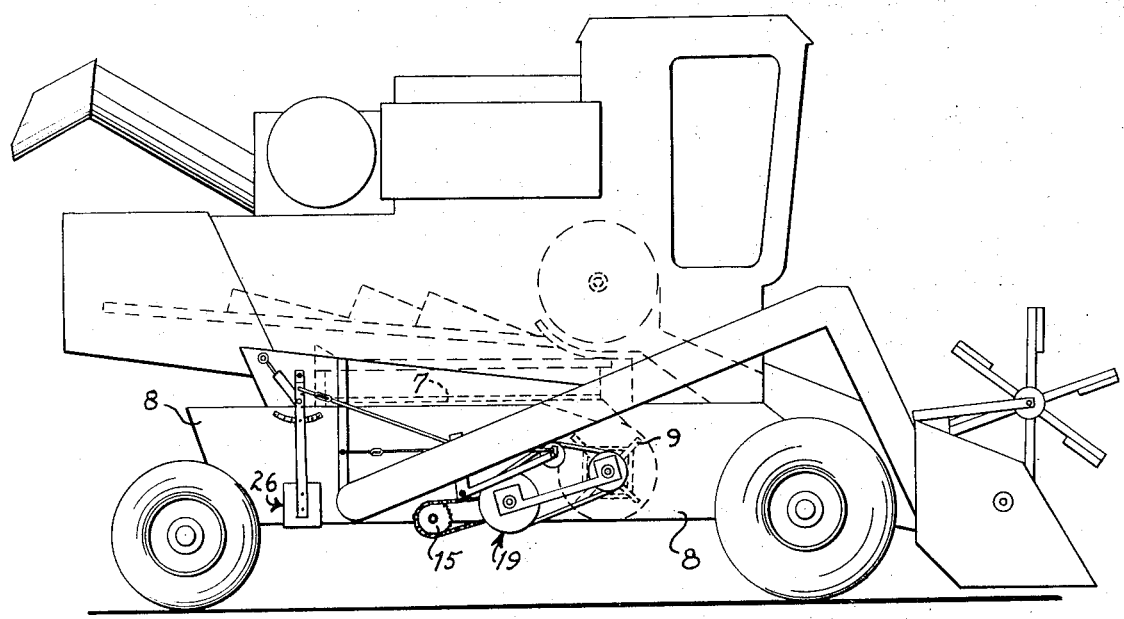
FIG. 1 is a schematic side view of a combine equipped with the present control assembly.
Figure 2:
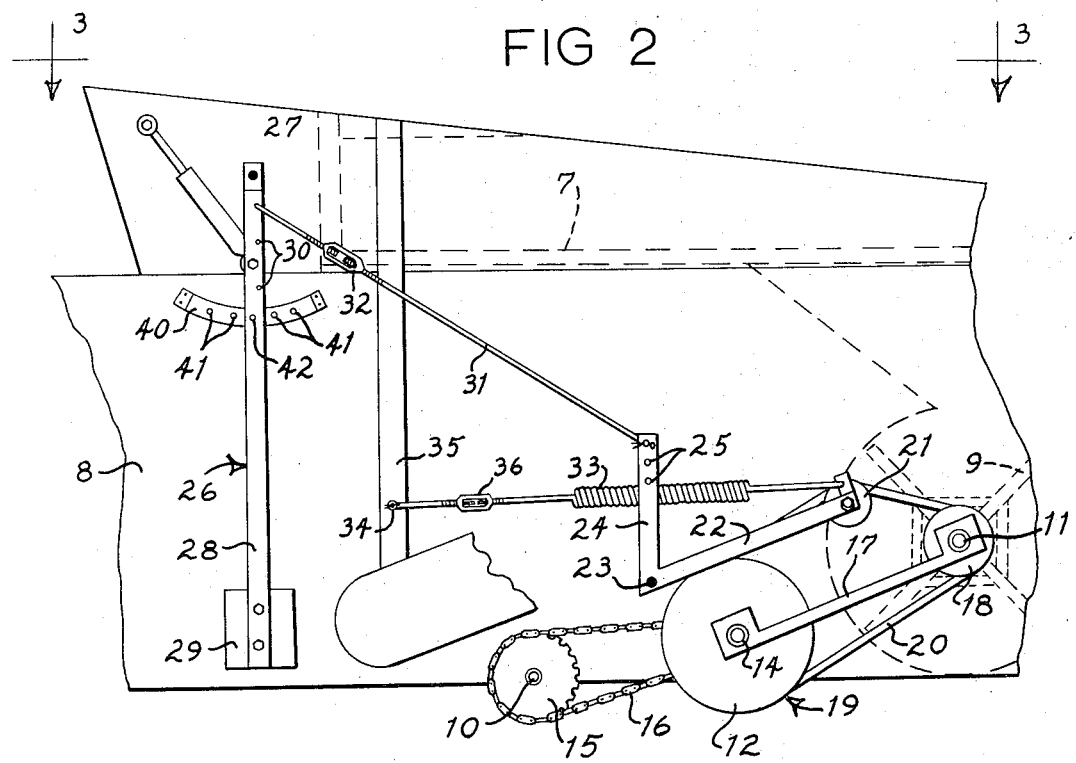
FIG. 2 is en enlarged side elevation view showing the control assembly mounted at the side of a combine.
Figure 3:
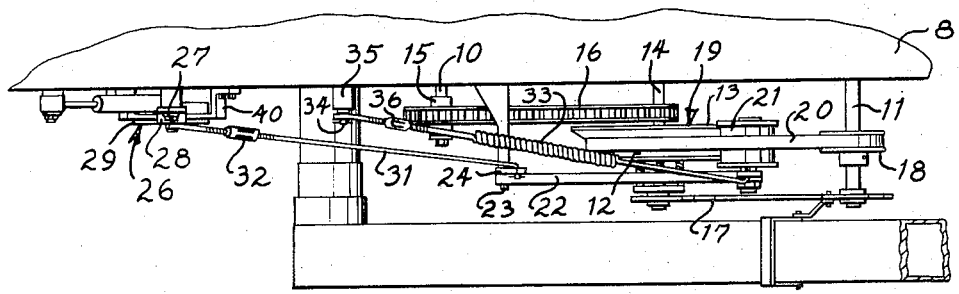
FIG. 3 is a top view of the control assembly as seen generally along line 3—3 in FIG. 2.

The present control assembly is interposed between the conventional driving shaft 10 and the fan shaft 11. Shaft 10 is connected to a source of operative power. Shafts 10 and 11 are transverse horizontal shaft supported by the combine frame for rotation about parallel rotational axes. They are typically connected by a driving chain and sprockets. In this modification, a variable speed drive is mounted on the combine between shafts 10 and 11. The variable speed drive comprises an axially split variable diameter pulley 19 having two halves 12, 13 mounted for axial movement along a pulley shaft 14. Shaft 14 is driven from shaft 10 by means of a driving sprocket 15 and a chain 16 that drives a reduced diameter sprocket fixed to shaft 14 inwardly of the variable diameter pulley (FIG. 3). The outer ends of shafts 14 and 11 are rotatably supported by a frame 17.

A fixed diameter pulley 18 is fixed to the fan shaft 11. A flexible endless belt 20 is entrained about the variable diameter pulley 19 and pulley 18 so as to permit effective transfer of rotative power from the variable diameter pulley 19 to pulley 18.

The drive ratio between pulleys 18 and 19 is controlled by means of a movable idler pulley 21. Pulley 21 engages the inner surfaces of belt 20 and is rotatably mounted at the outer end of a support bracket 22 pivoted to the combine about a fixed horizontal transverse axis by means of a pivot shaft 23. Bracket 22 includes an angularly projecting crank arm 24 that extends upwardly and is provided with a series of connecting apertures 25.

A relatively heavy pendulum 26 is pivotally mounted to the combine about the transverse horizontal axis of a pivot shaft 27. The depending stem 28 of pendulum 26 has a series of apertures 30 formed through it between the pendulum weight 29 and its pivot shaft 27. A rigid connecting link 31 is pivotally mounted between one of the apertures 30 and one of the apertures 25 on crank arm 24. The length of the linkage can be modified by means of a turnbuckle 32. The link 31 transmits movement of pendulum 26 to the crank arm 24.

In order to balance the forces on the idler pulley 21, there is provided a tension spring 33 having one end anchored to the combine and the opposite end connected to the support bracket 22 at a location adjacent to the idler pulley 21. The anchored end of the spring 33 is shown connected to an adjustable bracket 34 fixed along an upright member 35 on the side of the combine 8. A turnbuckle 36 is interposed between the bracket 34 and spring 33 to permit modification of the length of the spring assembly. By adjustment of the turnbuckle 36 and elevational adjustment of the bracket 34 one can manually adjust the force applied by spring 33 to the support bracket 22 at any desired level.

To initially set the apparatus, the combine 8 is placed on a level ground surface and the pendulum 26 is allowed to hang in a free vertical position. At this position, it is desired that the diameter of the variable diameter pulley 19 be approximately midway between its maximum and minimum limits. To achieve this, the turnbuckle 36 and bracket 34 are then adjusted so that the force applied to the support bracket 22 by the spring 33 places such a force on the idler pulley 21 that the belt 20 spreads the two halves 12, 13 of the variable pulley 19 to this desired midway condition. With the spring 33 set in this manner, the forces exerted on the idler pulley 21 by its connecting linkage to the pendulum 26 will be substantially balanced by the forces exerted thereon by spring 33. The idler pulley 21 essentially "floats" in equilibrium and a minimum amount of pendulum force is necessary in order to move it. The spring force overcomes the biasing forces of the conventional pulley springs that normally urge the two halves 12, 13 of the variable pulley 19 toward one another.

As can be seen in the drawings, a substantially horizontal plate 40 is fixed to the combine immediately behind the pendulum stem 28. Apertures 41 in this plate 40 correspond to an aperture 42 formed through the stem of the pendulum 26 and the pendulum 26 can be fixed relative to the combine 8 by means of a pin (not shown) or other fastening element extending through the apertures 41, 42. In this manner, one can selectively lock the mechanism at any desired speed ratio for constant fan speed where it is necessary to override the automatic variation of fan speeds.

Figure 4:
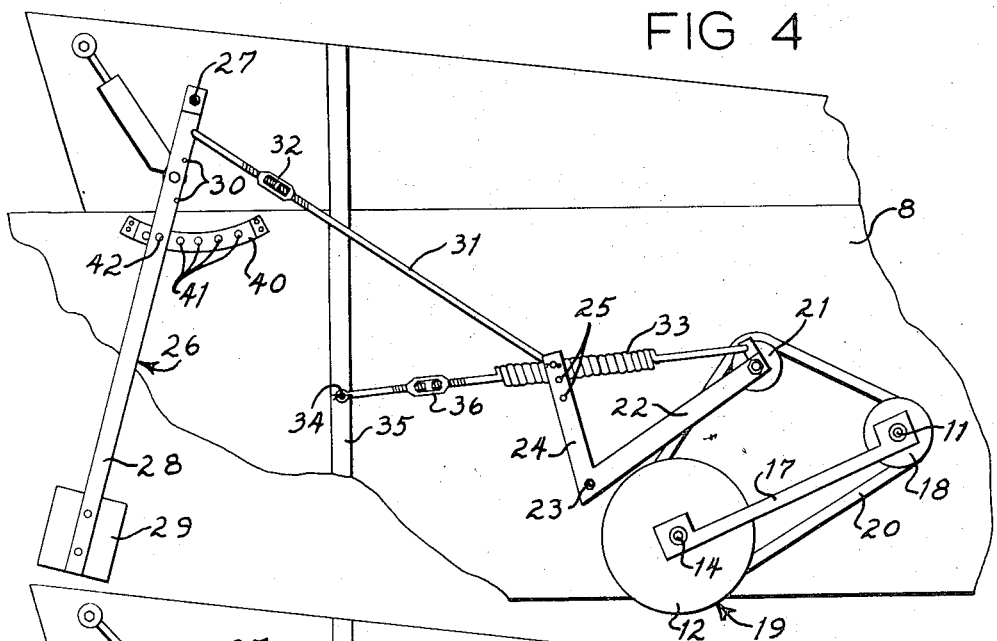
FIG. 4 is a view similar to FIG. 2, showing the pendulum viewing uphill movement of the combine.
Figure 5:
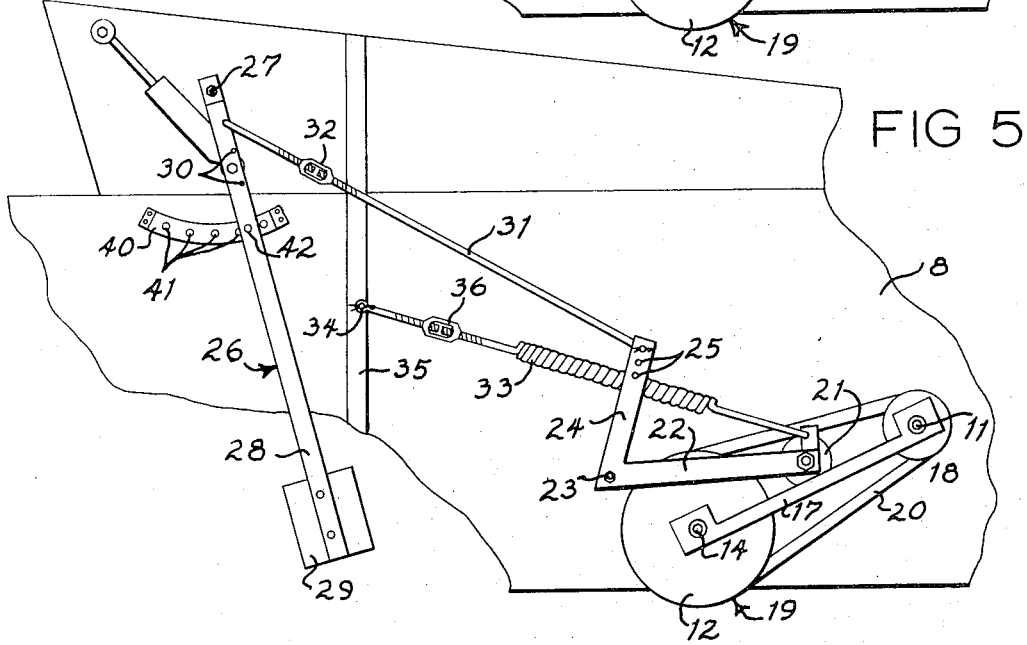
FIG. 5 is a view similar to FIG. 4, showing the control assembly when the combine is moving downhill.

The operation of the device is believed to be basically evident from the structural disclosure above. The fan speed is initially selected, by proper choice of sprocket and pulley diameters, to provide normal fan airstream requirements for operation on level ground. When the combine is moving uphill (FIG. 4) the vertical pendulum 26 will tend to spread the halves 12, 13 of the variable pulley 19, thereby decreasing the fan speed and slowing the travel of crop material rearward along the cleaning shoes 7. Conversely, when the combine is moving downhill, the vertical position of the pendulum 26 (FIG. 5) results in closing of the two halves 12, 13 of the variable pulley 19, increasing the resulting fan speed and the increased blast or stream of air along the cleaning shoes 7 tends to move the crop material rearward at a greater rate than would normally occur with a constant fan speed. By design of the pulleys and mechanical linkages, I have found that an effectively constant flow of crop material can be achieved along the cleaning shoes regardless of the longitudinal inclination of the combine.

Obviously many modifications can be made with respect to the choice of variable speed drive for the fan and the type of operative connection between the pendulum and variable speeds device. For this reason, the above description is presented only by way of example and is not intended to limit or define the boundaries of my invention.

Having thus described my invention, I claim:

1. A fan speed control for the fan of a hillside combine subject to longitudinal inclination from a horizontal working orientation and resulting forward or rearward inclination of the cleaning shoes; comprising:

a preset source of rotative power on the combine having an output shaft driven at a constant speed during combine operation;

variable speed drive means on the combine operatively connected between the output shaft of said source of rotative power and a fan for transmission of rotational movement to the fan from said source of rotative power;

a vertical pendulum comprising a weight suspended freely on the combine beneath a pivotal transverse axis for relative angular movement with respect to the combine in response to the longitudinal changes of inclination of the combine;

and means operatively connected between the pendulum and said variable speed drive means for controlling the rotational speed of the fan in response to the changed angular location of said pendulum about said axis relative to the combine to thereby power the fan at a preset rotational speed when the combine is in its horizontal working orientation and at a modified speed when the combine is inclined about the transverse axis.

2. A fan speed control as set out in claim 1 wherein said variable speed drive means comprises a lever-operated belt drive engaged with a drive pulley on the fan;

said last-named means comprising a mechanical linkage conected between the pendulum and the operating lever of the lever-operated belt drive.

3. A fan speed control as set out in claim 1 wherein said variable speed drive means comprises a split variable diameter pulley mounted to the output shaft of the source of rotative power, a pulley of fixed diameter mounted to a fan shaft, a flexible endless drive belt engaged about both pulleys, and a movable idler pulley engaged with the belt to control the diameter of the variable diameter pulley.

4. A fan speed control as set out in claim 1 wherein said variable speed drive means comprises a split variable diameter pulley mounted to the output shaft of the source of rotative power, a pulley of fixed diameter mounted to a fan shaft, a flexible endless drive belt engaged about both pulleys, and a movable idler pulley engaged with the belt to control the diameter of the variable diameter pulley;

said last-named means comprising a mechanical linkage operatively connected between the pendulum and the movable idler pulley for locating the position of the idler pulley in response to the angular location of the pendulum relative to the combine about its axis.

5. A fan speed control as set out in claim 1 wherein said variable speed drive means comprises an axially split variable diameter pulley having two halves spring biased toward one another, the variable diameter pulley being mounted to the output shaft of the source of rotative power and being operatively connected to the fan by means of an entrained flexible endless drive belt;

an idler pulley engaged against the drive belt;

a mounting support movably mounted to the combine about a transverse axis and carrying the idler pulley;

said last-named means comprising a mechanical linkage operatively connected between the pendulum and the mounting support for selectively locating the position of the idler pulley in response to the angular location of the pendulum relative to the combine about its axis;

and spring means operatively connected between the mounting support and combine for balancing the forces on the idler pulley when the pendulum is vertical and the combine is on level ground.

6. A fan speed control as set out in claim 1 further comprising:

locking means operably connected between the combine and pendulum for selectively fixing the angular location of the pendulum relative to the combine about its axis.

* * * * *